United States Patent [19]

Mayer

[11] 4,008,927
[45] Feb. 22, 1977

[54] CRANK SHAFT WELDED TOGETHER FROM INDIVIDUAL ELEMENTS

[75] Inventor: Karl Mayer, Nurnberg, Germany

[73] Assignee: Maschinenfabrik Augsburg-Nurnberg AG, Nurnberg, Germany

[22] Filed: June 9, 1975

[21] Appl. No.: 585,301

[30] Foreign Application Priority Data

June 8, 1974 Germany .............................. 2427801

[52] U.S. Cl. .................................... 308/23; 74/469; 123/195 R; 308/167; 308/179; 408/60
[51] Int. Cl.² ............................................ F16C 3/06
[58] Field of Search .................... 308/179, 23, 167; 74/469, 606; 123/195; 408/60

[56] References Cited

UNITED STATES PATENTS

| 3,123,058 | 3/1964 | Wooge | 308/23 |
| 3,265,451 | 8/1966 | Bulin | 308/23 |

Primary Examiner—Philip Goodman
Assistant Examiner—Richard A. Bertsch
Attorney, Agent, or Firm—Walter Becker

[57] ABSTRACT

A crankshaft which is composed of a plurality of individual elements. Each of said elements comprises a crankshaft section with an end face and bearing surface means and also comprises a main shaft journal section with an end face and with bearing surface means. The end faces of pin sections to be connected to each other are electron beam welded together after centering pins have been inserted in bores arranged in, and perpendicular to the end faces to be welded together.

7 Claims, 2 Drawing Figures

CRANK SHAFT WELDED TOGETHER FROM INDIVIDUAL ELEMENTS

The present invention relates to a crankshaft which is welded together from individual sections and in which the individual sections comprise a crank web and two half crank pins or one half crank pin and one half main shaft journal, while at the end faces of the half pins or journals there are respectively provided a centering means and a slag ring groove, and in which the said individual sections are prior to being welded together provided with all necessary lubricating passages.

A crankshaft of the above mentioned type has become known in which one of the two end faces of the half ring pins and of the main shaft journals, which end faces have to be welded together, have a centering protrusion entering a bore of the respective other end face. However, it has been found that the different design of the end faces has an unfavorable effect during the finishing operation as well as during the drop-forging. Directly around the centering means there is provided a slag ring groove. The lubricating oil passage extending from one bearing area to the other through the crankshaft is in each crankshaft section composed of two sections. On one hand, each section is from the end face provided with the centering protrusion equipped with a bore which is arranged centrally in the centering protrusion and extends parallel to the axis of the crankshaft. On the other hand, a passage extends from the bore for the centering protrusion of the adjacent welding connection at an incline through the crank web. Both passages meet each other in the interior of each crankshaft section and define the lubricating oil passage. A production of this type is rather expensive inasmuch as it requires a precise boring. Furthermore, the individual bores frequently have to be relatively long as a result of which a slight lack in precision can have harmful effects. On the other hand, frequently there exists the necessity to make the lubricating passages so complicate because a single inclined bore through the crank of the crankshaft is not possible. Even if this were possible, the bores would be relatively long. Finally, with the above mentioned design the lubricating passages leading to the bearing surfaces are designed as bores arranged adjacent the welding surface in only one of the journal halves or sections, which bores have to intersect with the axle bores.

It is, therefore, an object of the present invention so to improve a crankshaft of the above mentioned type that the manufacture of the individual sections as well as their assembly will be materially simplified and thereby reduced in price while in particular the lubricating oil passages can be more easily manufactured and a productive mass fabrication will be made possible.

These and other objects and advantages of the invention will appear more clearly from the following specification in connection with the accompanying drawing in which.

Figure 1:
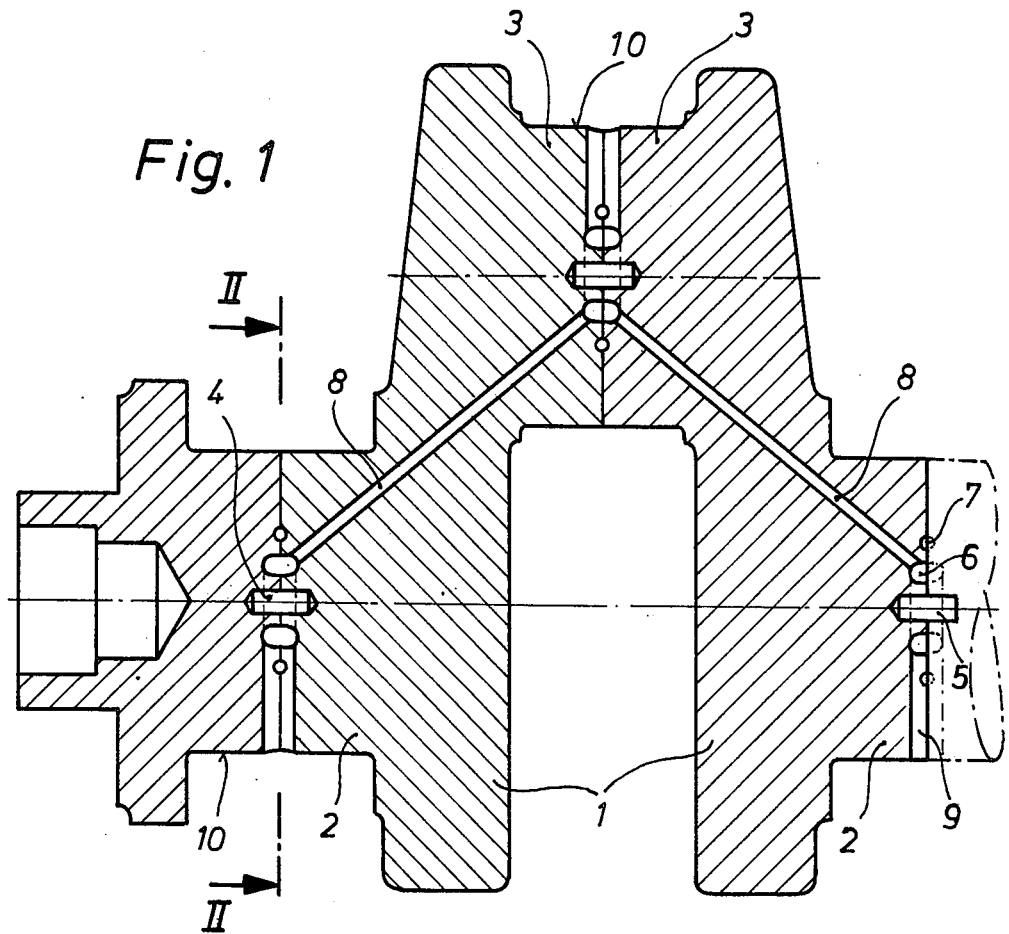
FIG. 1 represents a longitudinal section through a portion of a crankshaft according to the invention.

The crankshaft according to the present invention is welded together from individual sections; the individual sections each comprise a crank web and two half crank pins or one half crank pin and one half main shaft journal; the end faces of the half pins are respectively provided with centering means and a slag ring groove; the sections prior to being welded together are provided with all necessary lubricating passages. The foregoing is characterized primarily in that the centering means comprise at least one bore centrally arranged in each end face of a half crank pin or the main shaft journal and furthermore comprise a centering pin adapted to be inserted into two adjacent bores; furthermore between the centering means and the slag ring groove there is provided an annular lubricating oil groove one section of which is provided in one end face while the other section is provided in the adjacent end face. The crankshaft according to the present invention is furthermore characterized in that all lubricating channels provided in the crank webs as well as the lubricating passages extending in the radial direction with regard to the respective bearing surfaces lead into the annular lubricating oil grooves or start therefrom.

Due to the design of the centering means by means of centering pins, all individual sections of the crankshaft may be the same shape and can therefore be produced in a forging die which additionally when a separation is effected in the plane of the crank web can be very small. Due to this forging die, also a proper texture can be secured. This applies to all parts of crankshafts which are produced together with the counterweight while, if desired, changes in weight which might become necessary can be realized by the provision of bores. Also the finishing of all end faces is, of course, always the same, and continuous readjustments of the machines will not be necessary. The provision of the annular lubricating groove, in addition to permitting an easy manufacture has the important advantage that the lubricating oil passage leading from one separating area to the other through the crank web can be placed in the respective most favorable area whereby a minimum length will be realized and an otherwise necessary angling-off can be avoided. Also the placement of the radial lubricating passage in the welding plane results in a simplification of the manufacturing process and furthermore, as will be explained further below, when employing electron beam welding brings about the advantage that the beam can be started at the passage and a previous boring to the prescribed depth is not necessary. Inasmuch as this lubricating passage briefly crosses the slag ring grooves, a proper venting thereof is effected.

According to a further development of the invention, it is suggested in the end faces of the respective crank pins engaging each other and/or the main shaft journal outside the annular lubricating groove and the slag ring groove to provide an additional fixing bolt positioning the crank webs relative to each other whereby the precise angular position of the crank webs will be made possible and a later time-consuming alignment of the crankshaft will not be necessary. According to a particularly advantageous method of making a crankshaft according to the invention, the individual sections are designed symmetrically and are preferably drop-forged, all crank pin sections are finished including their end faces, all half main shaft journals are pre-machined, all lubricating oil passages are bored, each two half crank pins or sections are placed adjacent to each other and are set in conformity with their crank. Each two half crank pins are welded to each other by electron beam welding while, however, the electron beam starts at the radially extending lubricating passage and after one circulation ends at the same place and simultaneously is set for a depth which extends up to the slag ring groove or slightly beyond the same, each two half main shaft journals are arranged adjacent to each other and set as to their crank, the main shaft journals are electron beam welded, and finally the crank pins and main shaft journals are honed and the ends of the radial lubricating passages are mechanically rounded in one working operation. In connection with this method it is to be emphasized that the crank pins can immediately be finished, that the welding operation can be carried out in a minimum of time, and that due to the arrangement of only radial lubricating oil passages on the outer surface of the crankshaft, the ends thereof can be machine-rounded in one working operation. The finishing of the main shaft journals is therefore effected only after the crank pins have been welded together so that also even slight deviations in the length which could add to each other and lead to undue dimensions will be avoided.

Referring now to the drawing in detail, FIG. 1 shows a portion of a crankshaft according to the invention with crank webs 1, the half or main shaft journals 2 and the crank pin halves or sections 3. Each crank web 1 and two crank pins 3, or one crank pin section 3 and one main shaft journal 2 together form one part, preferably drop-forced. In the end faces of the main shaft journal sections 2 and the crank pin sections 3 there are provided central bores 4 into which is placed at each dividing area a centering pin 5. Around the centering pin 5 there is provided an annular lubricating oil groove 6, one half or section of which is provided in the crank pin journal 2 while the other half or section is provided in the respective adjacent crankpin section 3.

The annular lubricating oil groove 6 is surrounded by an annular slag ring 7 of a considerably smaller cross section.

Figure 2:
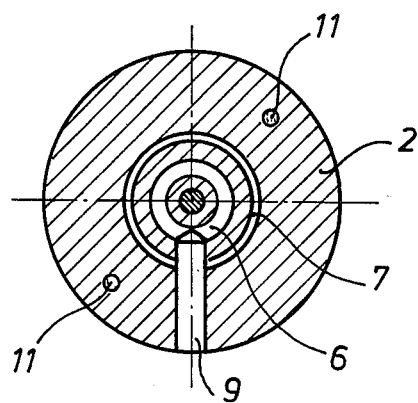
FIG. 2 represents a section through the crankshaft of FIG. 1, said section being taken along the line II—II of FIG. 1.

A lubricating oil passage 8 leads from the annular lubricating oil groove 6 of one section 2 or 3 to the annular lubricating oil groove 6 of the other respective pin section pertaining to the same section so that the oil passage 8 forms the shortest connection between the two annular grooves. Finally, lubricating passages 9 lead from the annular oil groove 6 in radial direction to the respective bearing surfaces 10. These lubricating passages 9 have one half or section milled into a pin section and cross the slag ring groove 7 whereby a venting thereof is possible. FIG. 2 shows that outside the annular slag groove 7, a fixing bolt 11 may be provided between each two crank webs for precisely setting the angular position.

It is, of course, to be understood that the present invention is, by no means, limited to the specific showing in the drawing but also comprises any modifications in the appended claims.

Thus, also the eccentric arrangement of one or more centering bolts is possible in connection with the present invention although such an arrangement is more complicated and expensive than the arrangement described above in detail.

What I claim is:

1. A crankshaft which includes: a plurality of individual elements each comprising a crank pin section with an end face and bearing surface means and also comprising a main shaft journal section with an end face and with bearing surface means, the end face of one crank pin section engaging and being welded to the end face of another crank pin section, and the end face of a main shaft journal section engaging and being welded to another main shaft journal section, each two welded together end faces of said elements being respectively provided with a bore perpendicular to the respective end face, and the bores of each two welded-together end faces being in axial alignment with each other; centering pins respectively inserted in said axially aligned bores, each of said welded-together end faces being provided with groove means extending in radially spaced relationship to and around the respective adjacent centering pin and forming an annular slag groove, each of said welded-together end faces also being provided with annular groove means interposed between and in radially spaced relationship to the respective adjacent centering pin and said annular slag groove and forming an annular oil groove, conduit means respectively arranged in said elements and establishing communication between the pertaining oil grooves of the respective individual element, and lubricating conduits respectively arranged in said welded-together end faces and communicating with the respective adjacent bearing surface means and with the respective adjacent oil groove.

2. A crankshaft according to claim 1, in which said bores are arranged centrally in the respective end face.

3. A crankshaft according to claim 1, in which each of said lubricating conduits extends radially with regard to the respective adjacent bearing surface means and is formed by two grooves of semicircular cross section respectively located in the welded-together end faces.

4. A crankshaft according to claim 1, in which said conduit means establishing communication between the pertaining oil grooves of the respective individual elements extend along a line forming the shortest distance therebetween.

5. A crankshaft according to claim 1, in which said conduit means and said annular oil grooves have substantially the same cross section.

6. A crankshaft according to claim 1, in which said centering pins, said annular grooves and said annular slag grooves are so arranged in said end faces of said elements as to take up at a maximum half of said crank pin sections and said main shaft journal sections.

7. A crankshaft according to claim 1, which includes fixing bolts arranged in said welded-together end faces for limiting the longitudinal dihedral angle.

* * * * *